United States Patent
Challener et al.

(10) Patent No.: US 7,380,268 B2
(45) Date of Patent: May 27, 2008

(54) METHODS APPARATUS AND PROGRAM PRODUCTS FOR WIRELESS ACCESS POINTS

(75) Inventors: David C. Challener, Raleigh, NC (US); Garry M. Kump, Apex, NC (US); Francis E. Noel, Jr., Durham, NC (US); David R. Safford, Brewster, NY (US); Douglas L. Schales, Mt. Kisco, NY (US); Leendert P. Van Doorn, Valhalla, NY (US)

(73) Assignee: Lenovo Singapore Pte. Ltd, Singapore (SG)

( * ) Notice: Subject to any disclaimer, the term of this patent is extended or adjusted under 35 U.S.C. 154(b) by 767 days.

(21) Appl. No.: 10/507,546

(22) PCT Filed: Nov. 20, 2002

(86) PCT No.: PCT/US02/33648

§ 371 (c)(1),
(2), (4) Date: Sep. 14, 2004

(87) PCT Pub. No.: WO03/083601

PCT Pub. Date: Oct. 9, 2003

(65) Prior Publication Data

US 2005/0114649 A1    May 26, 2005

(51) Int. Cl.
*H04L 9/32* (2006.01)
*G06F 11/00* (2006.01)
(52) U.S. Cl. ............... 726/2; 726/3; 726/22; 726/23
(58) Field of Classification Search ............ 726/11, 726/13–14, 22–25, 2–4; 709/223–225
See application file for complete search history.

(56) References Cited

U.S. PATENT DOCUMENTS

| | | | |
|---|---|---|---|
| 5,451,839 A | 9/1995 | Rappaport et al. | 375/224 |
| 5,657,487 A | 8/1997 | Doner | 455/456 |
| 5,765,107 A | 6/1998 | Korowajczuk | 455/410 |
| 5,844,522 A | 12/1998 | Sheffer et al. | 342/457 |
| 5,896,497 A | 4/1999 | Halstead | |
| 5,905,949 A | 5/1999 | Hawkes et al. | 455/410 |
| 6,697,103 B1* | 2/2004 | Fernandez et al. | 348/143 |
| 2001/0018326 A1 | 8/2001 | Link, II | 455/3.05 |
| 2004/0003285 A1* | 1/2004 | Whelan et al. | 713/201 |

FOREIGN PATENT DOCUMENTS

JP    2001-025067    1/2001

* cited by examiner

*Primary Examiner*—Hosuk Song
(74) *Attorney, Agent, or Firm*—Dillan and Yudel

(57) ABSTRACT

Methods, apparatus and program products which monitor wireless access points (12, 16) through which data can be exchanged with a network (10), identify an unauthorized access point (16), and respond to monitored data flow in a variety of manners including determining the location of the identified unauthorized access point, establishing filtering, and controlling accounting for access services.

23 Claims, 4 Drawing Sheets

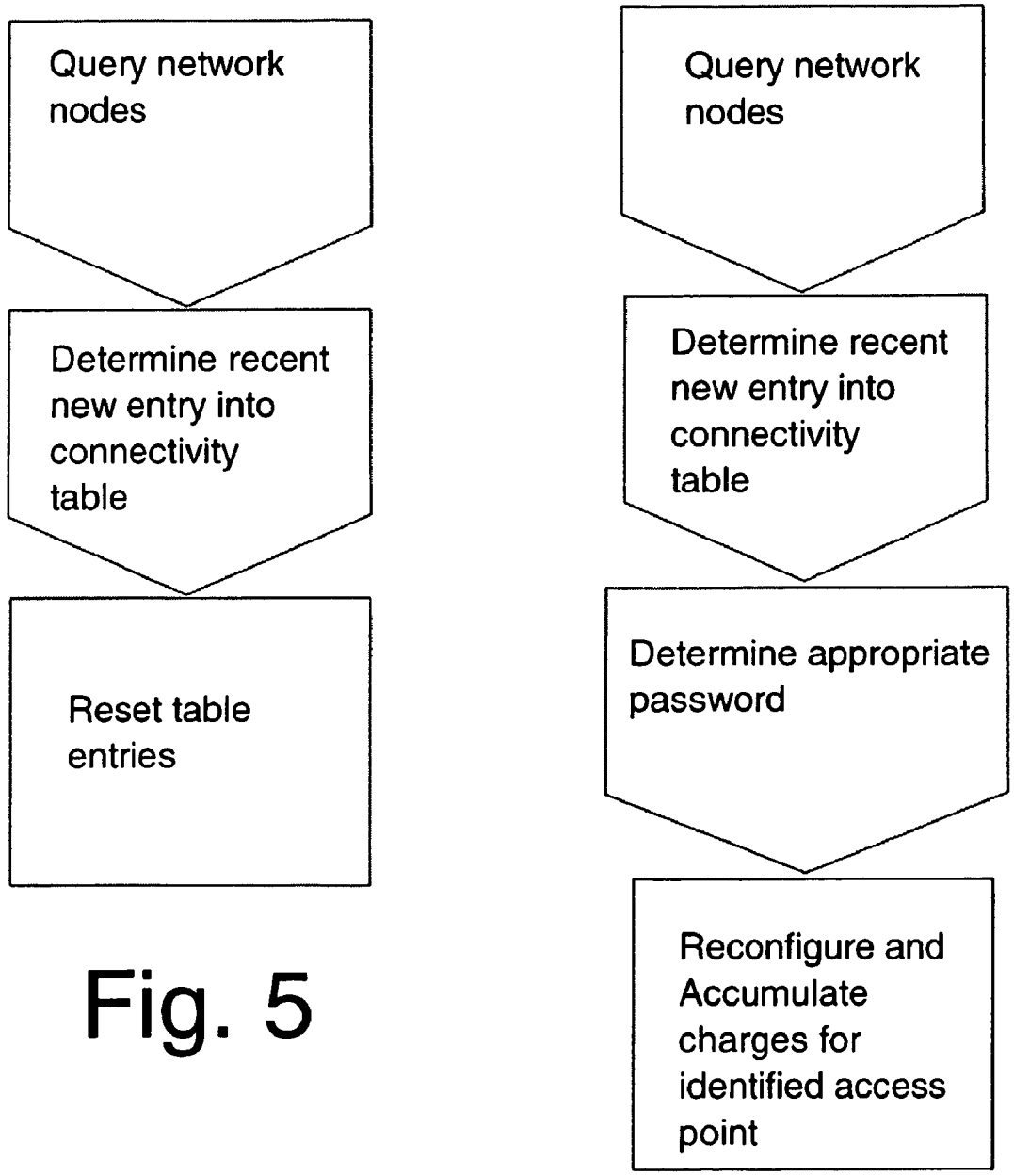

METHODS APPARATUS AND PROGRAM PRODUCTS FOR WIRELESS ACCESS POINTS

BACKGROUND OF THE INVENTION

The description which follows presupposes knowledge of network data communications and switches and routers as used in such communications networks. In particular, the description presupposes familiarity with the ISO model of network architecture which divides network operation into layers. A typical architecture based upon the ISO model extends from Layer 1 (also sometimes identified as "L1") being the physical pathway or media through which signals are passed upwards through Layers 2, 3, 4 and so forth to Layer 7, the last mentioned being the layer of applications programming running on a computer system linked to the network. In this document, mention of L1, L2 and so forth is intended to refer to the corresponding layer of a network architecture. The disclosure also presupposes a fundamental understanding of bit strings known as packets and frames in such network communication.

The 802.11 standard is a family of specifications created by the Institute of Electrical and Electronics Engineers Inc. for wireless local area networks in the 2.4-gigahertz bandwidth space. 802.11 can be thought of as a way to connect computers and other electronic devices to each other and to the Internet at very high speed without any cumbersome wiring—basically, a faster version of how a cordless phone links to its base station. With 802.11, electronic devices can talk to each other over distances of about 300 feet at 11 megabits a second, which is faster than some wired networks in corporate offices.

Devices using 802.11—increasingly known as Wi-Fi—are relatively inexpensive. A network access point can be bought for about $500 and will coordinate the communication of all 802.11 equipped devices within range and provide a link to the Internet and/or any intranet to which the access point is linked. The cards that let a laptop computer or other device "plug" into the network cost $100 to $200. Some personal communication devices come enabled for 802.11 communications without the need of an additional card. Wireless 802.11 cards and access points are flying off the shelves of computer suppliers. People want and find easy connectivity with 802.11-standard products. Such networks are also known by more formal names as ad-hoc wireless networks and, in some instances, as mobile ad-hoc networks or MANETs.

Providing so much wireless speed at a modest price is having profound implications for a world bent on anytime/anywhere communication. Wi-Fi is spreading rapidly. College students are setting up networks in their dorms and cafeterias. Folks in some parts of San Francisco are building 802.11 networks to cover their neighborhoods. Starbucks Corp., United Airlines Inc., and Holiday Inn, among others, are installing 802.11 networks in their shops, airport lounges, and hotels, in a nod toward their customers' desire to stay connected. It has been reported that, in 2000, the number of people using wireless local area networks rose by 150 percent, according to Synergy Research Group. Cahners In-Stat Group, a Scottsdale, Ariz.-based market research firm, sees the number of wireless data users in business growing from 6.6 million today to more than 39 million by 2006. Feeding this trend is the fact that almost a quarter of all workers in small or medium-sized business are mobile workers, spending at least 20 percent of their time away from the office. Wireless e-mail is their prime need, which is why mobile computing products with always-on e-mail capability continue to sell so well. In early 2002, it was estimated that between 25,000 and 50,000 people install and manage 802.11 networks every day.

The wireless trend will inevitably spill over into the home networking market. A major reason is price: The cost of access points, equipment that connects to the wireless network; and network interface cards, or NICs, that make the link between the PC and the access point, is dropping. Those low prices catch the eye of shoppers, which is why the home market grew 20 percent in the last quarter of 2001.

Successor technologies to 802.11 are on the horizon. One is ultra-wide band radio technology or UWB, which uses a wide spectrum technology at low power to transfer data at a very high speed. UWB will be perhaps ten times faster than 802.11, yet suffer from some of the same exposures described here. Another is the inclusion of radio frequency function directly on chips which perform other functions such as system central processors and network processors.

And there's the problem, and a real dilemma it presents. Once again, information technology administrators and users are caught between ease of use and requirements for security. There are two major problems with wireless today and which can be anticipated as remaining into the future. One is that all too often it is implemented without any kind of security at all. The other is that the out-of-the-box security options, if the consumer switches them on, are completely ineffectual. According to Gartner Dataquest, about thirty percent of all companies with a computer network have some kind of wireless network, either official or rogue. Furthermore, if the business or cafe next door has a wireless network, the business might be in trouble.

Wireless is so wide open, in fact, that it has given birth to a new technologist Olympic sport: war driving. The game is all about seeing how many potential targets can be found. All that is needed to play is a laptop, a wireless PC card, and some software. War driving has been widely discussed in the technical press and on technology web sites, and does occur on a regular basis. The new hobby for bored teenagers and technogeeks is to drive around with an antenna and GPS strapped to a laptop hunting for wireless access points. While most are not maliciously attacking networks and are carefully preventing themselves from accessing the network and any of the files contained therein, not everyone is so polite.

One of the more popular tools used in war driving, NetStumbler, tells you the access point name, whether encryption is enabled, and numerous other bits of information. NetStumbler is also a great tool for administrators trying to identify rogue, unauthorized, access points which have been connected in their organizations. One user picked up twenty access points during a quick drive down Highway 101 in Silicon Valley. Another user, cruising the financial district in London and using an antenna made from an empty Pringles brand potato chip can found almost sixty access points in thirty minutes. Kismet is a wireless network sniffer for Linux that includes many of the same capabilities as NetStumbler. AirSnort is a Linux-based tool that tries to recover encryption keys. These and many more tools are freely available on the Internet.

Although organizations still must be vigilant about securing their main Internet gateway, the corporate perimeter is expanding wirelessly. How many users access the internal network via a VPN or other means of remote access? How many of those users have wireless networks at home? Are they secure? If not, your internal network is vulnerable, regardless of how secure your main Internet gateway is.

Until 802.11 and UWB are made and proven secure, smart network managers will keep worrying. Particularly where employees lacking authorization to do so go to their friendly computer supply store, buy a wireless access point, bring it to their place of employment, and power it up connected to their employer's intranet.

It is important to note that access nodes or points today generally function at Layer 2 and have no knowledge of Layer 3 addressing, while the edge router which they are connected to has full knowledge of Layer 3 addressing. As technology has advanced more and more function has been incorporated into the access points. For example, originally these were simplistic "wiring concentrators" such as the IBM 8228 which was a completely unpowered product. Today these access points typically are Layer 2 switches with full knowledge of the Layer 2, or Medium Access Control (MAC), addresses of the devices that are connected to them, be they wireless or wired.

In the future these access points, with the advent of low cost Network Processors (as separately described in the literature), will become fully Layer 3 aware, particularly in respect to knowing the IP address of end stations connected to them. Of course today, an edge router already has this knowledge of IP addresses of end devices connected directly to it. Today all edge nodes and some access nodes have the capability to be, via the network, connected to a Network Management console using a messaging protocol known as Simple Network Management Protocol (SNMP). In the future all access nodes will have this capability.

SUMMARY OF THE INVENTION

The present invention has as a purpose enabling a network administrator or manager to identify the presence of a rogue, or unauthorized, access point, thereby assisting in enhanced security for networks. A further purpose is to enable determination of the geographic location of an unauthorized access point. The present invention also has as a purpose enabling a network administrator or manager to control the activity of a rogue, or unauthorized, access point. The present invention also has as a purpose enabling a network administrator or manager to automate the control of a rogue, or unauthorized, access point, thereby assisting in enhanced manageability for networks. The present invention also has as a purpose enabling a network administrator or manager to control the accounting or billing for activity exchanged with a network through a rogue, or unauthorized, access point, thereby assisting in enhanced financial security for networks.

These purposes are pursued by methods, apparatus and program products which monitor access points through which data can be exchanged with a network, identify an unauthorized access point, and control certain activity through the access point.

BRIEF DESCRIPTION OF THE DRAWINGS

Some of the purposes of the invention having been stated, others will appear as the description proceeds, when taken in connection with the accompanying drawings, in which:

FIGS. 2, 3, 5 and 6 are simplified flow charts showing steps performed in the network of FIG. 1;

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

As briefly mentioned above, a problem with the proliferation of the 802.11 standard is that it is easily possible for a person to set up a wireless access point to a network, without the information technology (IT) organization responsible for managing the network knowing about it. This is a problem because such access points may be (and usually are) misconfigured, thus granting to the world access to the network and data residing therein.

When such access points are put up, it may be difficult to determine by querying the network that they are there or how they are configured. This can vary depending upon the specific type of access point deployed and the network sophistication, as discussed more fully hereinafter. Current solutions for simple access points are to use Net Stumbler (or similar software) on a mobile computing device such as a notebook or personal digital assistant (PDA), use signal strength measurements to determine when the user is getting closer to or further away from an access point, and make manual reference to an index to determine if the access point is an unauthorized "rogue". This requires a person to periodically sweep through a facility to find any unauthorized access point.

This invention provides several ways to locate unauthorized access points quickly, without the necessity of having a wandering user.

Figure 1:
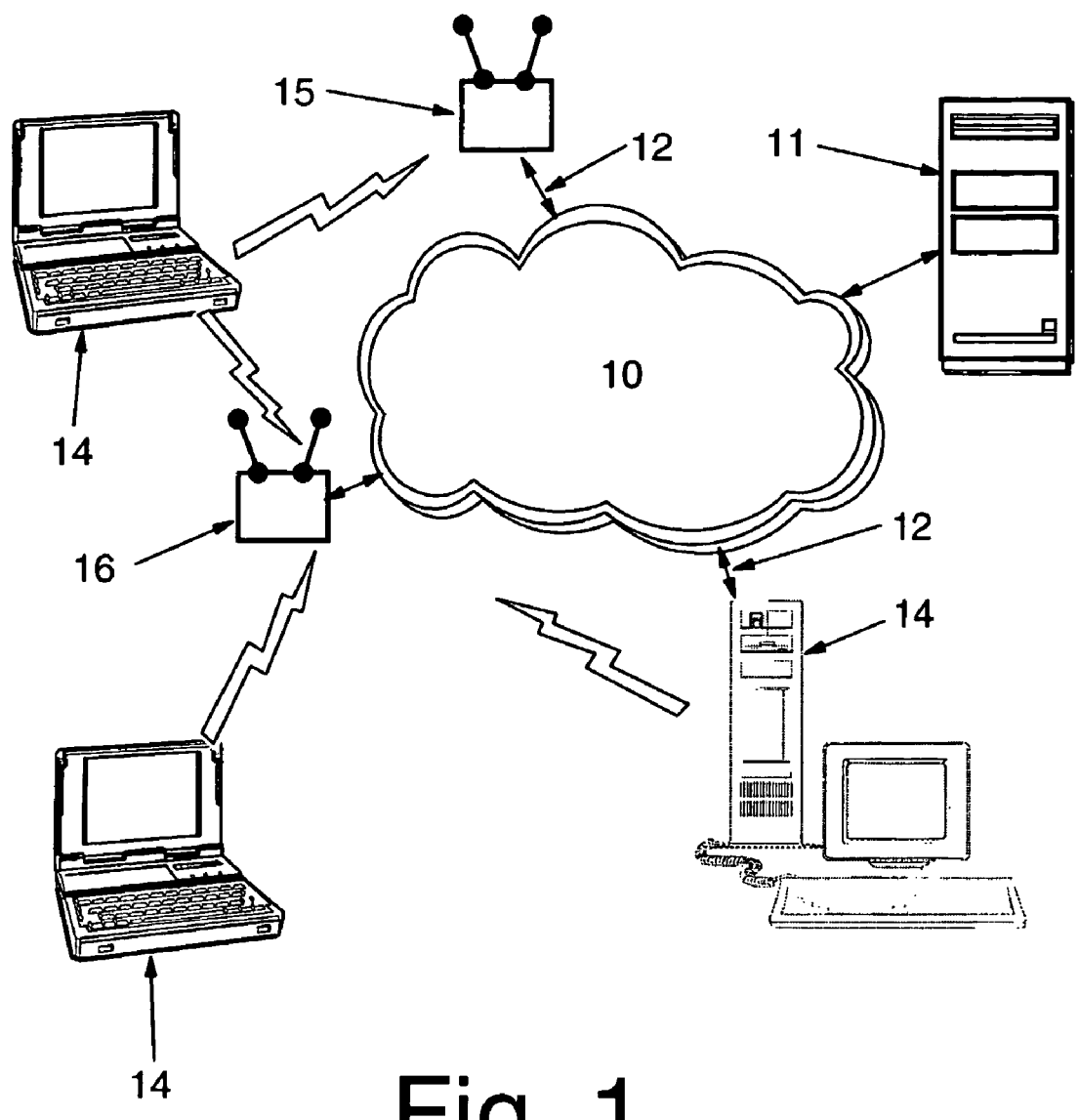
FIG. 1 is a schematic representation of a network installed within a facility, including workstation computer systems and a server computer system, and to which an unauthorized access point has been attached.

Referring now more particularly to the Figures, FIG. 1 illustrates a network 10 having a server computer system 11, a plurality of authorized access points 12 which may be either wireless or wired, and a plurality of workstation computer systems 14. Each workstation computer system 14 is coupled to the network, either through a wireless connection or possibly through a wired connection or both. Depending upon the size and scope of a facility, managed networks may have a mix of types of systems and types of connections. The workstations may be notebook computer systems, personal digital assistant systems, advanced function telephones, desktop or minitower systems, or other devices capable of accessing the network 10 through the access points.

Access to the network 10 may come through an authorized wireless access point 15 and, in the illustrated network, through an unauthorized or rogue wireless access point 16. The rogue access point 16 may have been established by an individual or group acting without the knowledge or permission of the information technology management. In accordance with some purposes of this invention, the detection and location of the rogue access point 16 is a goal to be accomplished.

Figure 2:
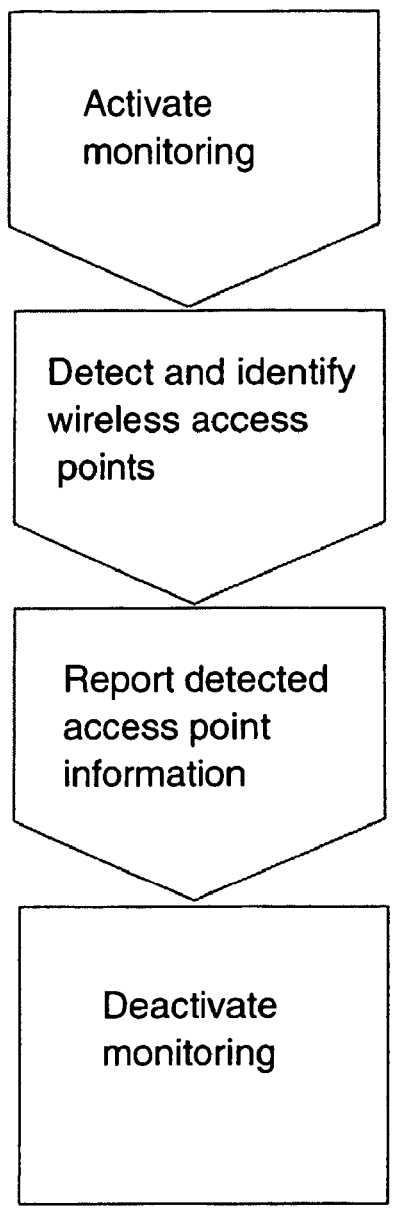

In accordance with the present invention, at least one, if not a plurality or even all, of the workstations 14 is equipped with a facility for wireless or radio frequency connection to the network 10. This or these workstations also have monitoring software installed, such as Net Stumbler, which is capable of detecting and gathering information about all wireless access points with which the system can communicate. In addition, and in accordance with this invention, the system(s) also has/have reporting software installed which is capable of passing the information gathered by the monitoring program back into the network 10 and to the server computer system 11. FIG. 2 represents schematically the functions of the software installed on a workstation 14 in accordance with the aspects of the present invention here under discussion.

Where it is desired that a minimal number of monitoring and reporting systems are used, the number may be reduced to what is known mathematically as a dense set. That is, a set of systems close enough to all points where a rogue access point might be located that at least one system will detect the rogue. For a small building or area, a single system may provide the dense set. For larger areas, a plurality of systems as shown in FIG. 1 are more desirable.

The present invention contemplates that the information gathered about access points detected by a workstation will include information about signal strength. The present invention also contemplates that the monitoring software may be executed periodically as distinguished from continuously. Thus, the software might be executed once an hour or once a day during normal business hours so as to avoid imposing an excessive burden on other uses of the workstations. Executing the monitoring software may require temporarily setting the network interface card (NIC) or wireless interface into a different mode to gather information, then resetting the interface so that normal operation continues. This can be done quickly enough so as to be outside the awareness of most if not all users. Monitoring may also include an initial check of the activity of the access points sensed, in order that signal strength measurements can be appropriately calibrated.

Using a single workstation to monitor will provide two data points: whether there is a rogue access point and the signal strength of the rogue access point. Discussion will follow later in this description of the potential advantages of using multiple monitoring stations.

As monitoring occurs and information is gathered, the information is reported through the network to the server 11. The information transmitted may be encrypted or otherwise sheltered against inappropriate access. The server system has software installed which receives the reported information, maintains a list of authorized access points, and compares the reported information to the list. The server system thereby identifies any rogue or unauthorized access point, such as the point 16 in FIG. 1, which has come within communications reach of one of the monitoring workstations. The server system also stores information about the reported signal strength.

Figure 3:
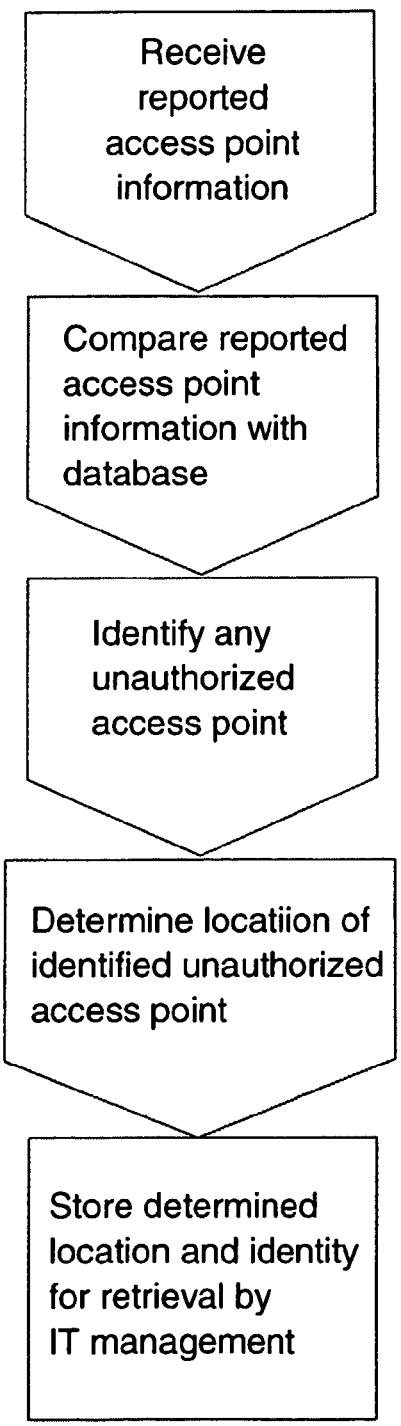

The responsible IT organization will know the location of each workstation 14 or be able to determine that location (should be workstation be mobile) by analysis of the signal strengths of the reported access points such as the points 15 and 16 in FIG. 1. From this information, and the reported signal strengths of the detection of a rogue access point, the location of a rogue access point can be determined. FIG. 3 represents schematically the functions of the software installed on the server system 11 in accordance with certain aspects of this invention.

The present invention contemplates that the operations described may be enhanced by such activities as providing wireless access points distributed through an area to be monitored and which are specifically not connected to the network. Such dummy access points will provide additional information about relative signal strengths and may assist in locating points which have been positioned somewhat remotely from authorized access points. Additionally, monitoring stations which are inactive as workstations may likewise be distributed through an area to be monitored specifically for the purpose of monitoring areas which may be somewhat remote from the usual distribution of fixed or mobile workstations. Information may be selectively gathered about monitoring stations as well as access points, providing additional data points for analysis. Such information about other clients may be monitored and reported, and the server system may use such information to locate—or not locate—monitoring systems as well as rogue and authorized access points.

With the workstations and server system cooperating, the present invention implements a method in which monitoring access points through which data can be exchanged with a network occurs, an unauthorized access point is identified, and the location of the identified unauthorized access point is determined. This follows from equipping each of a plurality of computer devices to detect access points accessible to the device and to report to a server computer system the identity of detected access points. Monitoring comprises intermittently and periodically determining the availability of access points, which can be intermittently and periodically determining the availability of access points by monitoring at predetermined regular intervals or at random irregular intervals. Identification an unauthorized access point is done by comparing the identity of monitored access points with a database of authorized access points. Determining the location of an identified unauthorized access point is done by comparing the locations of a plurality of computer devices all of which report detection of the identified unauthorized access point.

To this point in the present discussion, information concerning an access point is obtained essentially passively. Such passive acquisition of information may present difficulty where it is desired to reconfigure an access point as described hereinafter. While information obtained passively may include the MAC address, signal strength and at least some configuration data for an access point, it will not include the IP address which may be necessary to establish control over the access point.

The present invention contemplates a sequence of steps by which an access point identified as a rogue access point may be further identified. A "listening" client continues to monitor traffic through the access point, monitoring the packet stream to determine either an IP address of a client connecting to the access point or watching a DHCP occur. Information thus gathered is supplied to the server, providing sufficient information for the server to make a determination of whether the access point is in fact within an enterprise intranet. If the access point is within the enterprise intranet, then the server sends a message to a connected client directing the client to use active means to determine the IP address of the access point. This is done by an interogation technique, where a special ICMP packet is sent to the access point directed to the MAC address but broadcast to the subnet. The access point will reply with its IP address, which is then sent to the server.

Figure 7:
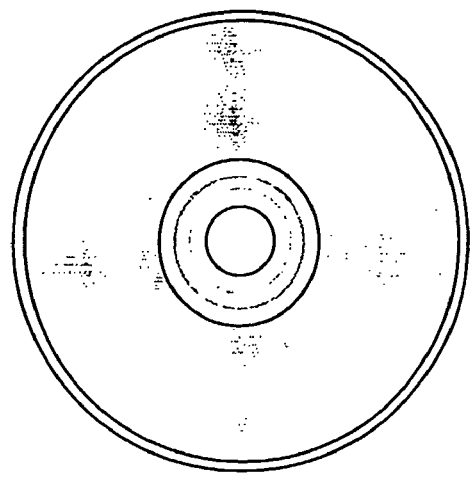
FIG. 7 is a view of a computer readable medium bearing a program effective when executing on an appropriate one of the systems of FIG. 1 to implement the steps of FIGS. 2, 3, 5 and 6.

Software appropriate to the functions described here may be distributed to users using computer readable media such as the disk shown in FIG. 7, which may bear software which, when executing on either a workstation system or a server system, causes the system to perform the sequences shown in FIGS. 2 and 3, as appropriate to the type of system onto which the software is installed.

Figure 4:
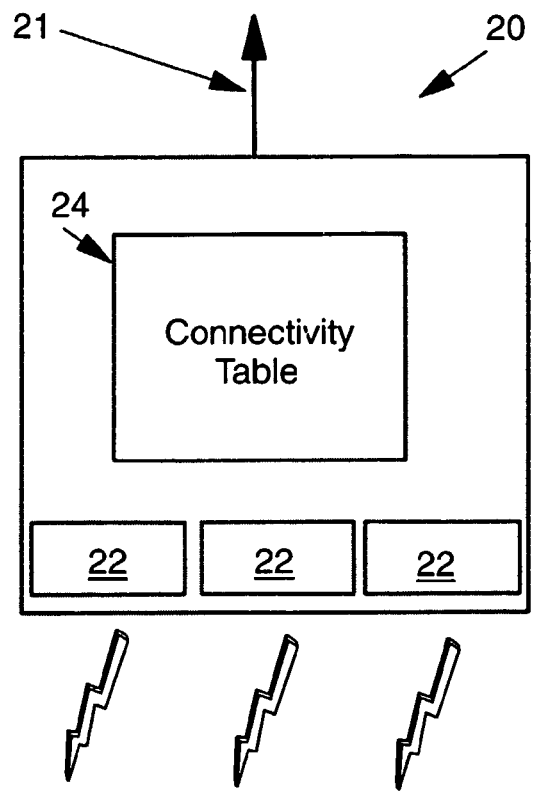
FIG. 4 is a schematic representation of a wireless access point such as may be functional in the network shown in FIG. 1 and which incorporates a network processor.

An exemplary access point in accordance with other aspects of this invention is illustrated in FIG. 4, where the access point is generally indicated at 20. The access point 20 is a node in the network 10, connected to certain other elements through a wired connection or interface 21 and possibly to others through wireless connections or interfaces 22. The access point 20 has a connectivity table 24 stored therewithin. The table may be stored in a network processor interposed between the two levels of interfaces 21, 22.

Industry consultants have defined a network processor (herein also mentioned as an "NP") as a programmable communications integrated circuit capable of performing one or more of the following functions:

Packet classification—identifying a packet based on known characteristics, such as address or protocol;

Packet modification—modifying the packet to comply with IP, ATM, or other protocols (for example, updating the time-to-live field in the header for IP);

Queue/policy management—reflecting the design strategy for packet queuing, de-queuing, and scheduling of packets for specific applications; and Packet forwarding—transmission and receipt of data over a switch fabric and forwarding or routing the packet to the appropriate address.

Although this definition is an accurate description of the basic features of early NPs, the full potential capabilities and benefits of NPs are yet to be realized. Network processors can increase bandwidth and solve latency problems in a broad range of applications by allowing networking tasks previously handled in software to be executed in hardware. In addition, NPs can provide speed improvements through architectures, such as parallel distributed processing and pipeline processing designs. These capabilities can enable efficient search engines, increase throughput, and provide rapid execution of complex tasks.

Network processors are expected to become the fundamental network building block for networks in the same fashion that CPUs are for PCs. Typical capabilities offered by an NP are real-time processing, security, store and forward, switch fabric connectivity, and IP packet handling and learning capabilities. NPs target ISO layer two through five and are designed to optimize network-specific tasks.

The processor-model NP incorporates multiple general purpose processors and specialized logic. Suppliers are turning to this design to provide scalable, flexible solutions that can accommodate change in a timely and cost-effective fashion. A processor-model NP allows distributed processing at lower levels of integration, providing higher throughput, flexibility and control. Programmability can enable easy migration to new protocols and technologies, without requiring new ASIC designs. With processor-model NPs, network equipment vendors benefit from reduced non-refundable engineering costs and improved time-to-market.

In accordance with conventional network operation, nodes in the network 10 maintain connectivity tables containing addresses of others nodes with which communication can be established. Depending upon the characteristics of the node in which such a table is maintained, the table may be known as a routing or trusted neighbor table. Such tables are periodically refreshed based on broadcast advertisements of detected connectivity. The present invention takes advantage of such routing or trusted neighbor tables and the ability of an intelligent node to perform processing as described above.

With this as background, the aspects of the present invention here under discussion contemplate that, on a periodic or random basis, a central site network management console can interrogate, using SNMP or more sophisticated techniques, the wireless access or wireless edge nodes. The goal in this interrogation is to determine the latest addition to the Layer 3 routing tables and to monitor the latest entries and their traffic flow for abnormal activities such as denial of server access. Alternatively, if interrogation is of a Layer 2 device, then the "trusted neighbor table" would be interrogated for the most recent entries and traffic monitored as above.

If immediate action is desired, then through SNMP and other techniques, either Layer 2 or Layer 3 filter tables (as appropriate) can immediately be set to deny assess to the network. If it is desired to attempt to apprehend the intruder, the location of the rogue access point may be determined using the signal strength techniques described above. To "stall" the intruder, the filtering tables can be set in either the Layer 2 or Layer 3 case to route the traffic exchanged with the rogue access point to a secure server, which can be programmed with a series of scripts giving an intruder the feeling that they are gaining access to the network.

Depending upon the capabilities of the management program and the access point, it will be possible in many circumstances to identify the manufacturer of an identified "rogue" access point. With the manufacturer identified, it will be possible to access, from an appropriately constructed table, the default configuration and password of such an access point. With the default password in possession and assuming no alternative installation by the personnel who "put the point up" on the network, the management system software can access the security features of the access point and reconfigure the access point beyond the reconfiguring of routing and trusted neighbor tables. More specifically, the access point can be converted into a recognized, non-rogue, access point and conventional network management controls applied. These management controls may include financial controls such as charging for access as well as security controls such as establishing system management determined passwords.

Important characteristics of this invention thus include the abilities to interrogate the routing tables in an edge router or the trusted neighbor table in an access point, interrogate these tables in a random or deterministic fashion to determine if there are new entries, monitor the traffic flow from these new entries to determine if they are having issues with the network, such as service denial, and, through routing and trusted neighbor tables to filter the intruder's traffic and either shut them down by appropriate entries into the tables or route their flows to a secure server to initialize a sequence of events to apprehend the intruder. These steps are as illustrated in FIG. 5.

Further, and in alignment with other goals of this invention, the identity of the access point if reconfigured will be added to registers of ports for which charges are allocated and usage and access charges will be accumulated against that port identity. The relevant steps are illustrated in FIG. 6.

Once again, and as mentioned hereinabove, programs effective to implement these steps while running on a system such as the server 11 may be distributed by writing onto appropriate computer readable media, such as the disk shown in FIG. 7.

In the drawings and specifications there has been set forth a preferred embodiment of the invention and, although specific terms are used, the description thus given uses terminology in a generic and descriptive sense only and not for purposes of limitation.

The invention claimed is:

1. A method comprising
monitoring access points through which data can be exchanged with a network;
identifying an unauthorized access point;
in response to an unauthorized access point being identified, determining make, model and default configuration password of said identified unauthorized access point by monitoring traffic passing through said identified unauthorized access point;

addressing said identified unauthorized access point using said determined default configuration password; and after gaining access thereto, reconfiguring said unauthorized access point to add an identity of said identified unauthorized access point to registers of ports for which charges are allocated such that access charges can be accumulated against said identity.

2. The method according to claim 1, further comprising determining a geographical location of said identified unauthorized access point.

3. The method according to one of claims 1 and 2, further comprising applying traffic filtering to monitored traffic passing through said identified unauthorized access point.

4. The method according to one of claims 1 through 3, further comprising accumulating charges for access and usage of network resources identified to said identified unauthorized access point.

5. The method according to one of claims 1 through 4, wherein said identifying further includes comparing identities of monitored access points with a database of authorized access points.

6. The method according to claim 5, wherein said monitoring further includes equipping each of a plurality of computer devices to detect access points accessible to said computer devices and to report to a server computer system identities of detected access points.

7. The method according to claim 5, wherein said monitoring further includes querying network nodes for recent entries into node identifying connectivity tables maintained at said network nodes.

8. The method according to one of claims 6 and 7, wherein said monitoring is performed intermittently and periodically.

9. The method according to claim 8, wherein said monitoring is performed at predetermined regular intervals.

10. The method according to claim 8, wherein said monitoring is performed at random irregular intervals.

11. The method according to claim 2, wherein said determining geographic location further includes comparing locations of a plurality of computer devices all of which report detection of said identified unauthorized access point.

12. The method according to claim 3, wherein said applying further includes denying access to said network through said identified unauthorized access point.

13. An apparatus comprising:
a computer system;
a network interface connected to said computer system to provide a communication channel between said computer system and a network;
means for monitoring access points through which data can be exchanged with said network;
means for identifying an unauthorized access point;
means for, in response to an unauthorized access point being identified, determining make, model and default configuration password of said identified unauthorized access point by monitoring traffic passing through said identified unauthorized access point;
means for addressing said identified unauthorized access point using said determined default configuration password; and
means for, after gaining access thereto, reconfiguring said unauthorized access point to add an identity of said identified unauthorized access point to registers of ports for which charges are allocated such that access charges can be accumulated against said identity.

14. The apparatus according to claim 13, wherein said computer system is a workstation computer system.

15. The apparatus according to claim 13, wherein said computer system is a server computer system.

16. The apparatus according to one of claims 14 and 15, further comprising a geographical location determining program effective when executing to derive said physical location of an unauthorized access point.

17. The apparatus according to one of claims 14 through 16, further comprising a traffic filter controlling program effective when executing to selectively impose a filter on traffic exchanged with said network through an unauthorized node.

18. The apparatus according to one of claims 14 through 17, further comprising an accounting control program effective when executing to accumulate charges for access and usage of network resources identified to said identified unauthorized access point.

19. A computer storage medium having a computer program product comprising:
computer program code for monitoring access points through which data can be exchanged with a network;
computer program code for identifying an unauthorized access point;
computer program code for, in response to an unauthorized access point being identified, determining make, model and default configuration password of said identified unauthorized access point by monitoring traffic passing through said identified unauthorized access point;
computer program code for addressing said identified unauthorized access point using said determined default configuration password; and
computer program code for, after gaining access thereto, reconfiguring said unauthorized access point to add an identity of said identified unauthorized access point to registers of ports for which charges are allocated such that access charges can be accumulated against said identity.

20. The computer storage medium according to claim 19, wherein said computer storage medium further includes computer program code for determining a geographical location of said identified unauthorized access point.

21. The computer storage medium according to one of claims 19 and 20, wherein said computer storage medium further includes computer program code for applying traffic filtering to monitored traffic passing through said identified unauthorized access point.

22. The computer storage medium according to one of claims 19 through 21, wherein said computer storage medium further includes computer program code for accumulating charges for access and usage of network resources identified to said identified unauthorized access point.

23. The computer storage medium according to one of claims 19 through 22, wherein said computer storage medium further includes computer program code for comparing identity of monitored access points with a database of authorized access points.

* * * * *